US008036995B2

(12) United States Patent
Van Doorn

(10) Patent No.: US 8,036,995 B2
(45) Date of Patent: Oct. 11, 2011

(54) METHOD FOR PROGRAMMING BY REHEARSAL

(75) Inventor: Markus Gerardus Leonardus Maria Van Doorn, 'S-Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 827 days.

(21) Appl. No.: 12/067,675

(22) PCT Filed: Sep. 22, 2006

(86) PCT No.: PCT/IB2006/053459
§ 371 (c)(1),
(2), (4) Date: Mar. 21, 2008

(87) PCT Pub. No.: WO2007/034455
PCT Pub. Date: Mar. 29, 2007

(65) Prior Publication Data
US 2008/0256005 A1    Oct. 16, 2008

Related U.S. Application Data

(60) Provisional application No. 60/720,086, filed on Sep. 23, 2005.

(51) Int. Cl.
G06F 17/00 (2006.01)
G06F 17/20 (2006.01)
(52) U.S. Cl. ........................................................ 706/11
(58) Field of Classification Search ............... 706/11
See application file for complete search history.

(56) References Cited

U.S. PATENT DOCUMENTS

| 6,243,707 B1 | 6/2001 | Humpleman |
| 6,882,897 B1 * | 4/2005 | Fernandez .................. 700/132 |
| 7,429,936 B2 * | 9/2008 | Paradiso et al. ............. 340/988 |
| 7,522,970 B2 * | 4/2009 | Fernandez .................. 700/132 |
| 7,930,056 B2 * | 4/2011 | Fernandez .................. 700/132 |
| 2004/0003548 A1 | 1/2004 | Sahai |
| 2004/0169662 A1 | 9/2004 | Riemann |
| 2004/0181292 A1 | 9/2004 | Ha |

OTHER PUBLICATIONS

P. Hansson et al., "D3.2 Undestanding and Using the Tangible Toolbox," ACCORD, IST-2000-26364, Sep. 2002.*
AMEC—facilitating a user centred evolution to ambient intelligent environments, Alvarez, A.; Arcos, A.; Herrasti, N.; Intelligent Environments, 2006. IE 06. 2nd IET International Conference on vol. 2 Publication Year: 2006 , pp. 61-67.*
Ambient intelligence framework for context aware adaptive applications, Acampora, G.; Loia, V.; Nappi, M.; Ricciardi, S.; Computer Architecture for Machine Perception, 2005. CAMP 2005. Proceedings. Seventh International Workshop on Digital Object Identifier: 10.1109/CAMP.2005.9 Publication Year: 2005 , pp. 327-332.*

(Continued)

Primary Examiner — Michael B Holmes

(57) ABSTRACT

A system (100), apparatus (106 107), and method are provided for an end-user to program-by-rehearsal an Ambient Intelligence environment comprising an Ambient Narrative of at least one beat (104). The end-user's rehearsal actions are visualized on a screen 106) of a portable device (101) that the end-user carries and uses to make inputs while rehearsing a beat being programmed in the actual physical space where the beat is active. The programming-by-rehearsal actions are instantly visualized on a virtual stage (106), i.e., screen, of the portable device (101) so that the end-user has immediate feedback concerning the effects of programming-by-rehearsal actions taken by the end-user.

24 Claims, 12 Drawing Sheets

OTHER PUBLICATIONS

The physical layer of ambient intelligence, van Houten, H.; VLSI Technology, 2005. (VLSI-TSA-Tech). 2005 IEEE VLSI-TSA International Symposium on Digital Object Identifier: 10.1109/VTSA. 2005.1497061 Publication Year: 2005 , pp. 9-12.*

Multimedia Content Repurposing in Ambient Intelligent Environments, Hossain, M.S.; Hossain, M.A.; El Saddik, A.; Data Engineering Workshop, 2007 IEEE 23rd International Conference on Digital Object Identifier: 10.1109/ICDEW.2007.4400972 Publication Year: 2007 , pp. 49-55.*

M. Van Doorn "Mass Customization in Ambient Narratives" Philips Research Technical Note PR-TN-2004/00370, May 2004.

P. Markopoulos et al "End-User Configuration of Ambient Intelligence Environments: Feasibility from a User Perspective" Proc. of the 2nd European Symposium on Ambient Intelligence, vol. 3295, Nov. 8, 2004.

P. Hansson et al "Deliverable 3.2 Understanding and Using the Tangible Toolbox" Sep. 2002.

T. Zhang et al "Empowering the User to Build Smart Home Applications" Sep. 2004.

* cited by examiner

METHOD FOR PROGRAMMING BY REHEARSAL

The present invention relates to a system, apparatus and method for customizing an Ambient Intelligence environment by users not skilled in the art, i.e., the general public. More particularly, a performance metaphor is applied to programming an Ambient Intelligence environment whereby a "rehearsal" of a performance by a member of the general public accomplishes the programming of the Ambient Intelligence environment.

Ambient Intelligence denotes a new computing paradigm that aims to improve the quality of life of members of the general public by making everyday activities more convenient and enjoyable through the use of digital media. Technically, Ambient Intelligence refers to the presence of a digital environment that is sensitive, adaptive, and responsive to the presence of people. Electronic devices are embedded in furniture, clothing or other parts of the environment; the technology recedes into the background of our everyday lives until only the function (i.e., the usage interface) remains visible to people at large.

At the same time, the member of the general public moves into the center of attention, in control of the devices around him. These work in concert to support the performance of everyday activities in an intelligent manner.

By moving technology and devices into the background and the experience of a member of the general public into the foreground, the Ambient Intelligence vision acknowledges the shift from a supply-driven industrial economy into a demand-driven, global, informationally networked economy. In this networked economy, people pay for access to personalized information and services that meet their widely-divergent and individual needs and wants (instead of paying for ownership of standard, mass-produced physical products). This leads one to view Ambient Intelligence as a personalized information service (an Ambient Intelligence service) simultaneously delivered over one or more networked devices to individual members of the public, i.e., users, where the devices are present in the users' environments. The Intelligence provided by the service is not bundled together with the ambience in a single and inflexible physical product, like a TV or set-top box, but offered separately as a service over simple network appliances that provide the Ambient Intelligence.

Producing Ambient Intelligence on a larger scale is problematic. First, it is technologically not possible in the foreseeable future to mass-produce a product or service that generates Ambient Intelligence, given the current state-of-the-art in machine learning and artificial Intelligence. Economically, however, it is not feasible to manually design and produce Ambient Intelligence applications for each member of the public individually.

Currently, it is difficult for end-users who are members of the general public to customize or program the set of networked devices. End-users can use remote controls or other user interfaces to control devices and in some cases they can customize the user interface (universal remote control); but beyond this, the possibilities are often restricted. As more and more devices become network-enabled, the idea of a universal remote control must be abandoned altogether. The alternative, letting end-users program their own intelligent environment, often requires considerable expertise and programming skills and is therefore also not a viable option. What is needed is a way that allows end-users that are non-skilled in the art of Ambient Intelligence, i.e., the masses, to program their own Ambient Intelligence environments in a simple and intuitive way.

The system, apparatus, and method of the present invention provide a different manufacturing approach designed as an Ambient Intelligence service to be consumed on a mass basis, to produce Ambient Intelligence applications customized through an individual user's input and feedback where the individual user is a member of the general public.

Ambient Intelligence is a vision of the future of consumer electronics that refers to the existence of a digital environment that is sensitive, adaptive, and responsive to the presence of people in general. A preferred embodiment of the present invention provides a system, apparatus, and method for customization of Ambient Intelligence environments by the masses or the general public. A preferred embodiment provides an Ambient Intelligence environment comprising an "Ambient Narrative" defined as an interactive Narrative situated in mixed reality, which emerges out of on-going interactions with users (masses, i.e., general public) have with the Ambient Intelligence environment.

More specifically, a preferred embodiment provides a system, apparatus, and method for the general public to "author" an Ambient Narrative by customizing a publicly supplied pre-defined Ambient Narrative comprising a set of pre-defined, interrelated, modular parts called "beats." These "beats" are customized and sequenced by an "Ambient Narrative engine" based on user feedback, usage context and past such customizations (i.e., captured past experiences of the user with the Ambient Intelligence environment) into a unique mixed reality story called Ambient Intelligence.

A preferred embodiment includes a collection of networked devices with which to build customized Ambient Intelligence environments on a mass basis, i.e., by the general public. In a preferred embodiment, modular parts of Ambient Intelligence descriptions are assembled based on a user's feedback and interaction history into a flow (sequence) of personalized, interactive media presentations in which the multiple networked devices participate simultaneously. Thus, the system, apparatus, and method of the present invention provide an Ambient Intelligence service that allows members of the general public to create their own Ambient Intelligence environments within the scope of possibilities of a pre-existing Ambient Narrative which is an interactive Narrative in mixed reality that is designed to support people at home or in a particular service encounter in performing their everyday activities.

Figure 8:
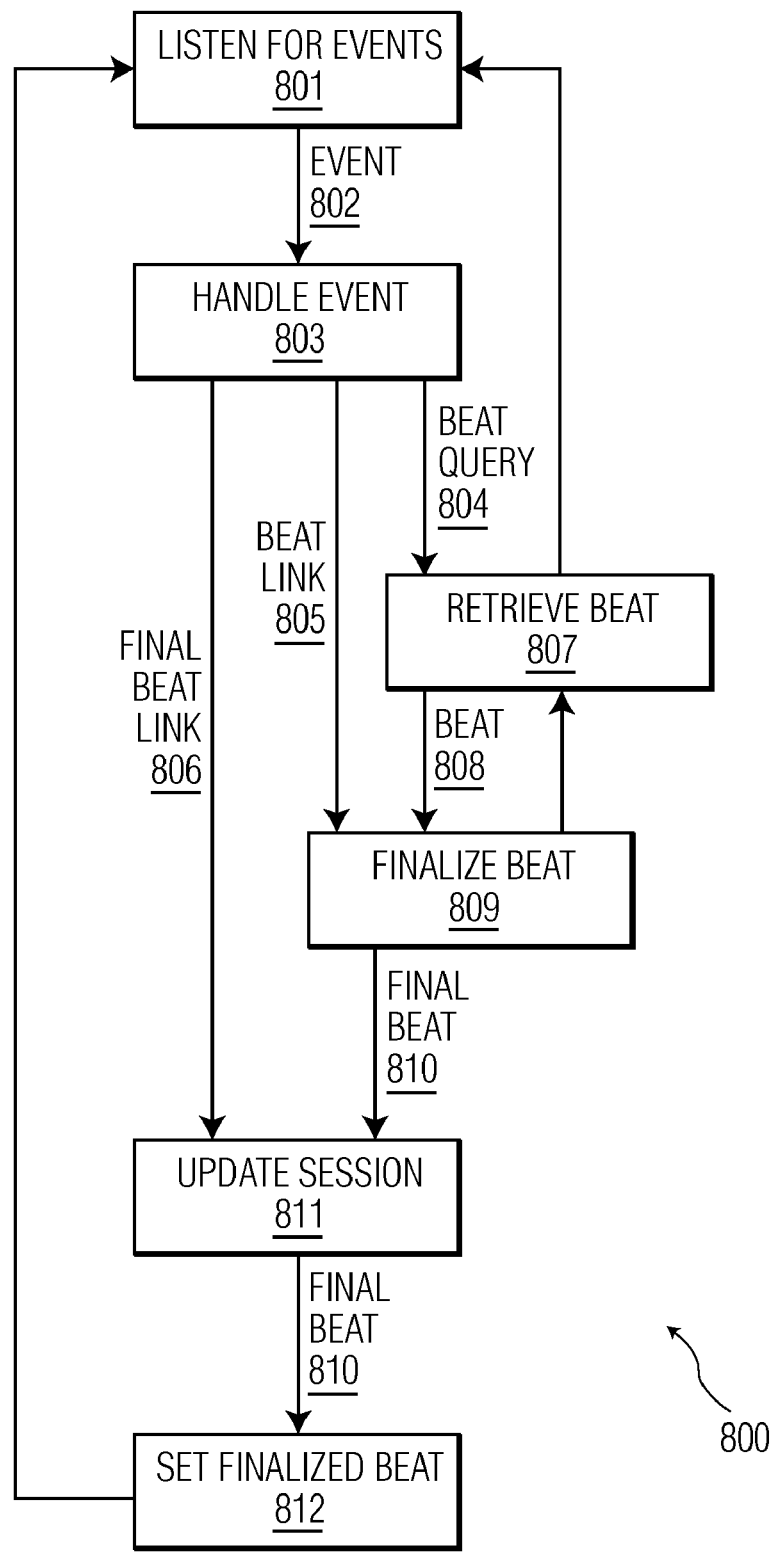
Figure 9:
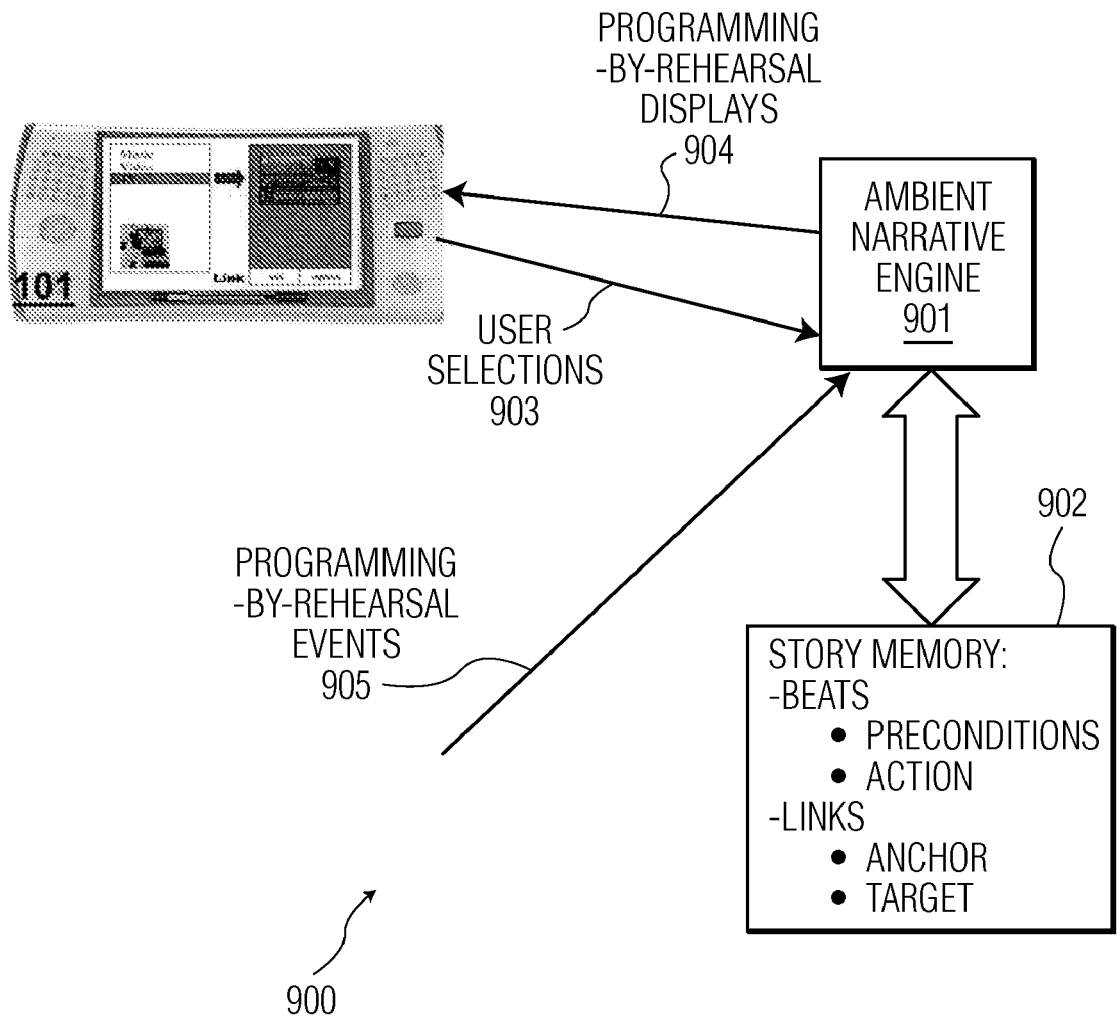
Figure 10:
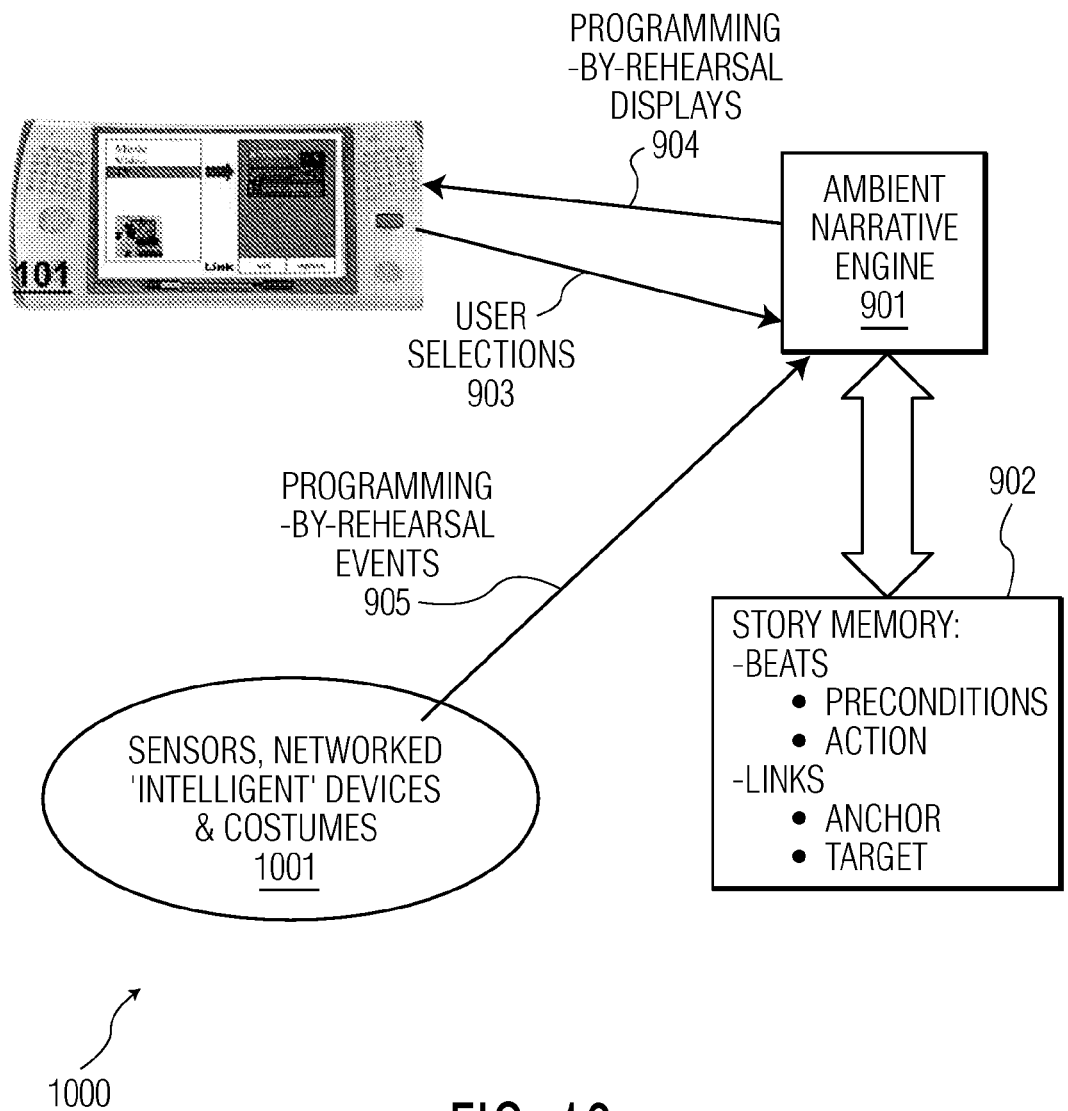
Figure 11:
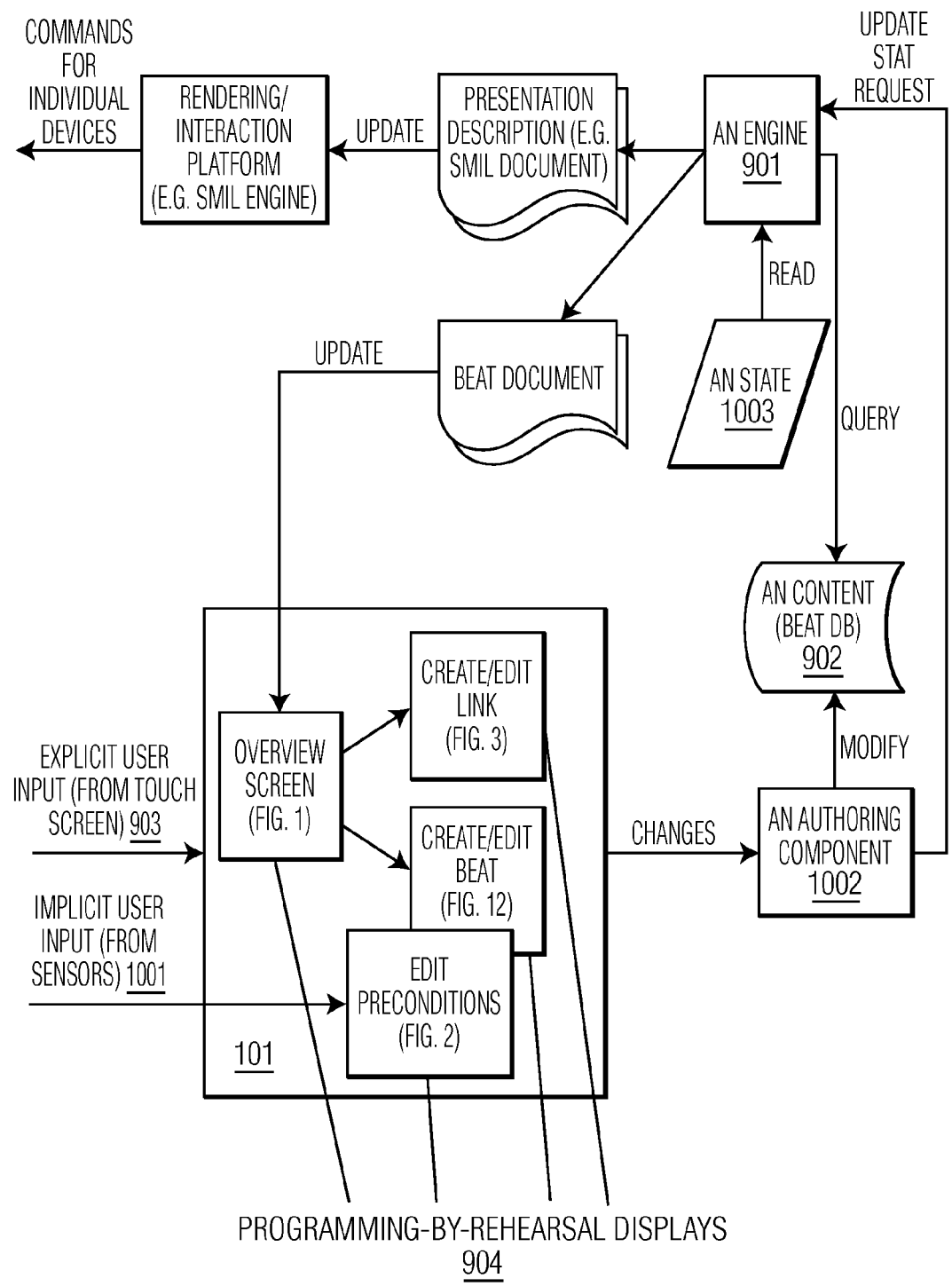

FIG. 8 provides a flow diagram of an Ambient Narrative engine;

FIG. 9 illustrates an apparatus modified according to the present invention to program an Ambient Intelligence environment by rehearsal;

FIG. 10 illustrates a system of networked wireless devices modified according to the present invention to provide an Ambient Intelligence service;

FIG. 11 illustrates the apparatus of FIG. 9 in greater detail; and

Figure 12:
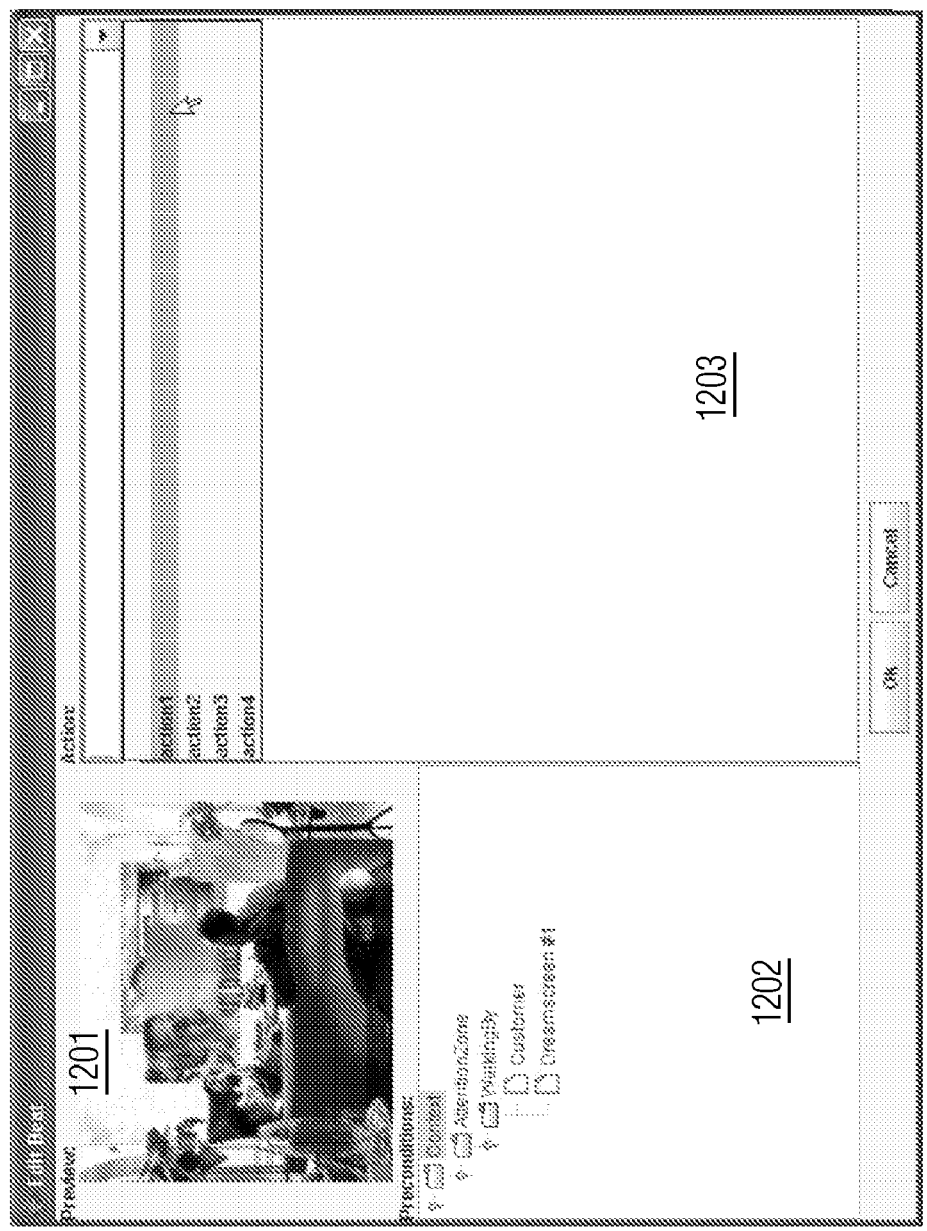

FIG. 12 illustrates the structure of the ambient narrative where end-users can add/remove their own beats.

All embodiments of the present invention are based on the concept of performances in everyday life. Put simply, Ambient Intelligence aims to help people in performing their daily activities better, by making these activities more convenient and enjoyable: by introducing interactive media. Notice the word "performing" in this description. The word "performing" is so commonly used in human language that people forget that performances are pervasive to every culture. Performances are not just made in the theater, music, dance and performance arts, in general, but also in everyday lives. For example, people perform the role of a father or son in their personal lives but may also perform the role of a doctor, judge or police officer in their professional, public lives. In order to understand where and how Ambient Intelligence can be applied to support these performances, a better insight into what performances are and what it means to perform is provided in the following sections.

Performance studies is an emerging, yet wide-ranging, interdisciplinary field that takes performances as the organizing concept for the study of a wide range of human behavior. It embraces research in the social sciences from anthropology to theatrical studies. Performance studies regards the prevailing division of the arts by medium and culture as arbitrary and, therefore, looks at performances from a holistic, postmodern, broader view towards literature and Western theater. Because performances vary so widely from medium to medium and culture to culture, it is hard to pin down an exact definition of performance. The definition assumed by the present invention is that performance is "ritualized behavior conditioned/permeated by play" or "twice-behaved behavior." When people are performing, they show behavior that is at least practiced once before in a similar manner. In traditional performance arts this behavior can be detected easily: actors in a theater play, opera or movie rehearse their roles off-stage and repeat this behavior when they are on stage. But this twice-behaved behavior can also be seen in a priest conducting a wedding ceremony, a surgeon operating on a patient or a service employee behind a counter. Even in their own homes, people show signs of this repeated behavior. This happens for example, during everyday rituals, like brushing your teeth in front of a mirror in the morning, watching a soccer match with friends, or coming home from work in the evening. Note that, here, the sending and receiving party in a "performance" may be the same.

In this invention social life is viewed as theater. It is assumed that people follow culturally specified social scripts that interact with each other. Social scripts may differ from culture to culture and from epoch to epoch, but no culture exists without social scripts. People are performing all the time, most of the time without knowing they are.

If social scripts are universal and people communicate with others by performing these scripts, it is assumed that knowledge in human minds is structured in a similar way, especially in the context of understanding language. The concepts of scripts, plans and themes have been proposed to handle story-level understanding in which specific memories are stored as pointers to generalized episodes (scripts), plus any unique events for a particular episode. Scripts allow individuals to make inferences needed for understanding by filling in missing information.

Viewing life as a social theater is relevant to the present invention for two reasons:

1. First, if people behave according to social scripts, it is possible to codify interactive media applications to support people in carrying out these scripts. Just as lighting and sound effects add to the overall drama of a theater play, Ambient Intelligence is applied by the present invention to enhance human performance described by these social scripts. This approach leads to a concise and concrete definition of Ambient Intelligence used by the present invention: Ambient Intelligence environment is a media-enhanced environment that supports everyday life performances of humans.

2. Second, positioning Ambient Intelligence in performance studies provides a well-studied and familiar frame of reference for the design of Ambient Intelligence environments and their underlying technology.

Preferred embodiments of the present invention incorporate a paradigm directed to media-enhanced performances, i.e., Ambient Intelligence in the home and in professional service encounters. The home people live in is seen as a stage on which people perform everyday rituals, such as brushing their teeth, going to work or watching a soccer match. Consider an example of how Ambient Intelligence is applied to improve the experience of such a daily activity of tooth brushing.

Figure 4:
FIG. 4 illustrates a mirror TV including an Ambient Intelligence apparatus according to the present invention.

FIG. 4 shows a cartoon 402 projected on a mirror TV 401 (a two-way mirror with an LCD screen behind) that invites a small child 403 standing in front of the mirror 401 to brush his teeth for two minutes. The cartoon 402 helps the child through this daily task. In the mirror TV example, the cartoon 402 shifts the attention of the child 403 from achieving the end result to the process of getting there. The cartoon 402 increases the flow of the activity by improving the level of engagement.

The central role of performances is also reflected in business literature about services where an experience economy has been proposed in which work is theater and every business a stage such that staged experiences are valued higher by customers than delivered services, manufactured goods or extracted raw materials. Staged experiences fulfill a larger subset of customer needs, so they are willing to pay a higher price for them. In this experience economy, culture itself is pulled into the commercial sphere. Entertainment parks, themed shopping malls and organized tourist travel are just some examples where people no longer buy things, but pay to gain access to services and a commodified culture.

Further, service marketing includes a theater framework in which services are seen as performances, front-end service personnel as actors, a service setting or "servicescape" is the stage on which the service is performed, products used in the services as props and the business process of the service is the script. The "servicescape," the environment of the service plays an important role in how people perceive a service encounter. Therefore, in all preferred embodiments of the present invention that relate to professional service delivery, Ambient Intelligence is applied to the professional service encounter to enhance the atmosphere of the service encounter and thereby the perception or performance of the service in a positive way.

Figure 5:
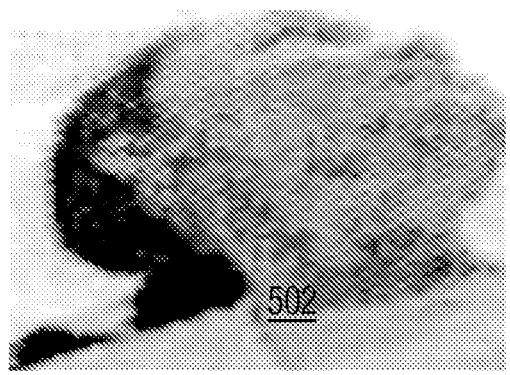
FIG. 5 illustrates a medical-imaging device including an Ambient Intelligence apparatus according to the present invention.
Figure 5:
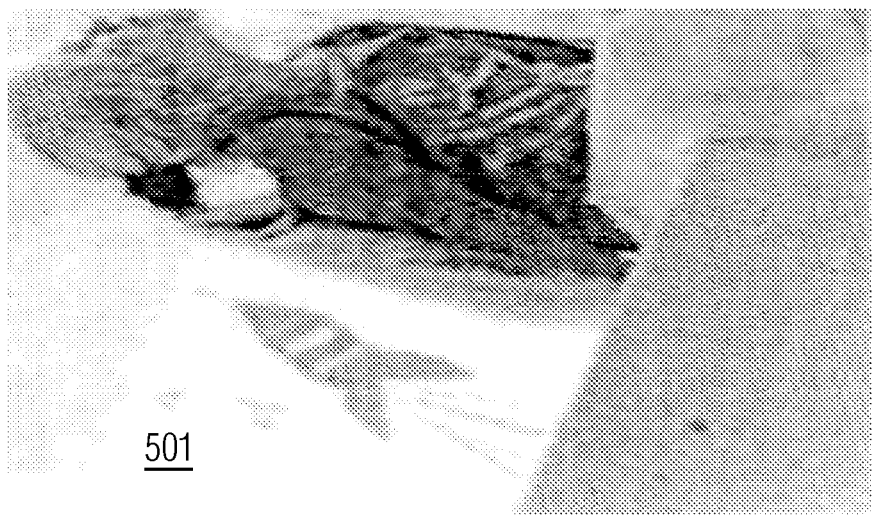

Consider, for example, a medical-imaging room in a hospital 500. Many patients are frightened by the bulky equipment in the examination room. By enhancing this environment with immersive media, e.g., by projecting video clips on the walls 501 and ceiling 502 of the examination room, patients may feel more at ease, as illustrated in FIG. 5.

The medical-imaging room 500 and bathroom with mirror TV 400 are examples of media-enhanced environments augmented by Ambient Intelligence that are designed to support everyday life performances in professional (possibly private) or public spaces.

Ambient Narrative AN

To model media-enhanced performances in the home and commercial/professional service encounters in a machine-understandable way, the present invention represents the structure and interrelationships of a set of related media-enhanced performances as an interactive or episodic Narrative. Interactive narratives allow consumers to affect, choose or change the plot of a story. Most interactive Narratives are situated either in the real world (e.g., live-action role playing games, improvisational theater) or in some virtual reality (e.g., hypertext novels, computer games). The media-enhanced performances used by the present invention occur in mixed reality. The behavior of people and the use of products in a media-enhanced performance take place in the real world, but the digital media to augment the performance originates from a virtual dimension. Thus, the term used for such a presentation environment is mixed reality.

Further, these media-enhanced performances are not really "read" like a book or hypertext novel, but enacted like a theater play. The term Ambient Narratives denotes these kinds of dramatic, interactive Narratives that play in the mixed reality setting. Thus, Ambient Narratives can be viewed from both a consumer's (reader) and a producer's (writer) perspective.

From a reader's point of view, interaction with an Ambient Narrative creates an Ambient Intelligence environment. Interaction is used very broadly in this invention as an Ambient Narrative can span both virtual and physical dimensions at the same time. Media-enhanced performances in different rooms may be linked to each other in one Narrative structure, allowing people to influence the plot of the Ambient Narrative (the evolving Ambient Intelligence). For example, by walking around, or, touching a glowing lamp. From a writer's perspective, the Ambient Narrative describes all possible media-enhanced performances and their inter-relationships.

The Ambient Narrative approach outlined above enables mass customization of Ambient Intelligence because it enables each individual user to mix and match the desired Ambient Intelligence from predefined plot material and to modify this material by "rehearsing" changes in the Ambient Intelligence environment.

In general, for a mass customization strategy to work there must be:
  Modularity present in the product or service;
  A user interface through which consumers can easily enter product requirements or specifications;
  A flexible line of products/services designed to provide customized products/services on a mass basis; and
  A network to connect the consumer interface to the flexible product line.

In the Ambient Narrative approach, modularity is achieved by the Ambient Narrative itself which comprises the modular parts of possible Ambient Intelligence experiences that can be assembled. The user interface is implemented by an Ambient Browser that collects user input and context information from multiple devices and sends this information over a network to the flexible product line. The flexible product line is implemented by an Ambient Narrative engine that determines what the next best part is, given this information and the current position in the Ambient Narrative plot. The Ambient Narrative engine returns the presentation description inside the newly selected part to the Ambient Browser that renders this presentation. So together, the Ambient Browser and Ambient Narrative engine assemble the customized product and Ambient Intelligence and deliver it as an Ambient Intelligence environment to the actor.

Figure 6:
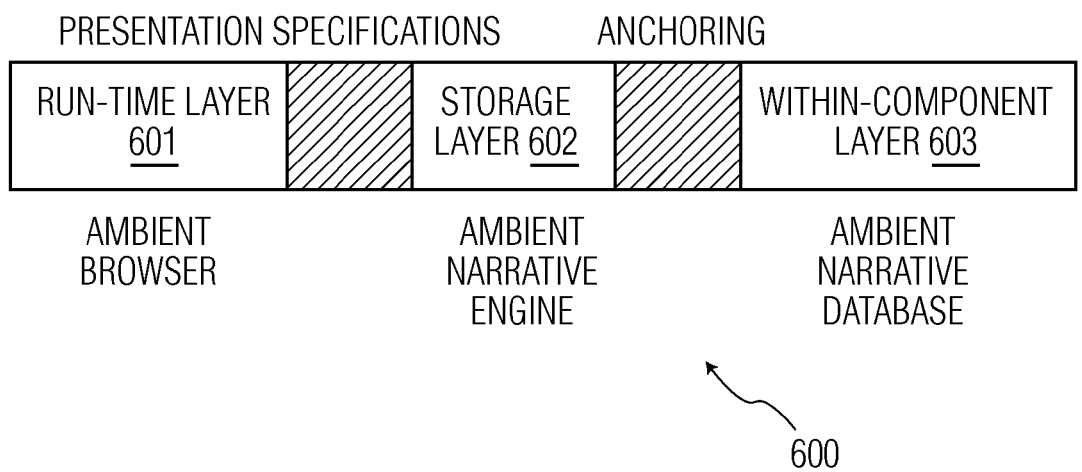
FIG. 6 illustrates a mapping of a high-level Ambient Narrative system architecture to a three-layer model.

In a preferred embodiment, a three-layer model is used comprising a run-time layer, a storage layer and a within-component layer. FIG. 6 shows the mapping of a high-level Ambient Narrative system architecture to this three-layer model. The following sections explain how the run-time layer 601 is implemented by the Ambient Browser, the storage layer 602 by the Ambient Narrative engine and the within-component layer 603 by the plot material of an Ambient Narrative.

Run-Time Layer: Ambient Browser

In a preferred embodiment, the interface with the storage layer 602 is through presentation specifications. Presentation specifications are encoded at the storage layer 602 and contain information about how a component/network is to be presented to the user. This way, the presentation of a component to the user is a function of the specific tool that is doing the presentation (e.g., Microsoft Internet Explorer), the property of the component itself (e.g., the specific HTML document) and/or the link taken to that component. Presentation specifications provide a generic way for the storage layer 602 to communicate with the run-time layer 603 without violating the separation between these layers.

Figure 7:
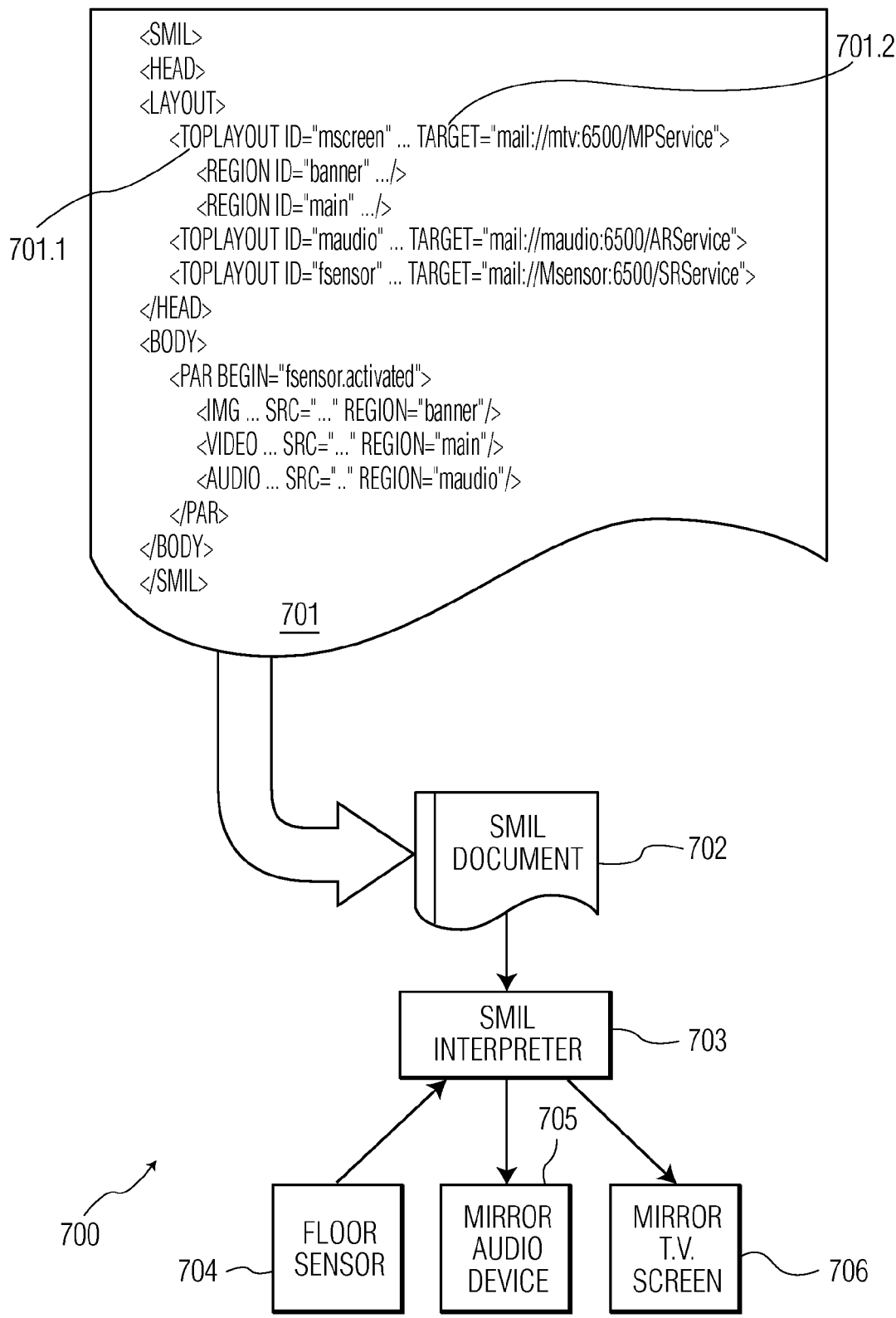
FIG. 7 illustrates an outline of an SMIL document for the mirror TV example of FIG. 4.

To support timing and synchronization of media objects within and across devices, an existing synchronized multimedia integration language (SMIL) interpreter is used. This SMIL interpreter has the role of a networked service to which the other devices register themselves. The underlying reason for this choice is that "media" includes lamps, fans and other output devices. To use this functionality in SMIL, the top layout element of the SMIL is extended in a modified SMIL language having a new target attribute that specifies the rendering (or input) device. The author of an SMIL document can set the target attribute of the toplayout? element in the SMIL head part to point to a specific rendering or input device. In the SMIL body part, the author can use (as is normally done) the ID of the toplayout element or the ID of one of its region element children in the region attribute of a media element (e.g., an image, or a video fragment), to indicate the device/region on which the media element should be rendered. FIG. 7 describes the outline of the SMIL document that belongs to the mirror TV example 400 of FIG. 4. The advantage of this approach is that there is no need to introduce spatial mapping functions outside an SMIL engine.

SMIL documents are basic building blocks, i.e., the components in the storage layer. The advantage of this approach is that it is possible to abstract from the low-level positioning of media objects in space and time and focus in describing how presentations are selected based on context situations.

Storage Layer Ambient Narrative Navigation

The storage layer in the model describes the mechanisms by which nodes and links are connected to form networks. The storage layer itself is not specific about the internal structure of the components; components are treated as generic data containers. The components of the Ambient Narrative are called beats. The term beat originates from theater play and film script-writing and is defined as a change in the behavior of a character. The beat is the smallest unit within a scene that represents a greater change in behavior. Sequences of scenes form acts which culminate into even greater change. So, an Ambient Narrative is equivalent to a hypertext network consisting of beats (nodes) and links between these beats.

An individual Ambient Intelligence experience is represented by a sequence of beats and any specific parameters that may have been used in the instantiation of these beats. So, specific memories (Ambient Intelligence experiences) are represented as pointers to generalized episodes (beats) plus any unique events for a particular episode (represented by story values, as explained shortly).

Beat Language

First a language for representing beats is described, followed by an explanation of how beats are sequenced by a beat-sequencing engine or Ambient Narrative engine.

A beat is a component in the storage layer of the Dexter model. It consists of three parts: the pre-conditions, action and post-conditions part. A story memory is needed that contains story values that can affect the plot of the Ambient Narrative. The goal of this mechanism is to make the system less reactive. Writers can use story values in each part of the beat description as a mechanism to influence the selection of a new beat based on, for example, the current state of the story (e.g., the knowledge level of a particular user) or specific context information (Ambient temperature or humidity). The story memory comprises at least one of dynamically changing story values or variables.

The pre-conditions part (component information) is checked during the selection or search for a new beat component by the beat-sequencing engine or Ambient Narrative engine that controls the navigation through the Ambient Narrative. The pre-conditions part specifies the conditions that must hold before the beat can be selected: it can contain information about the activity (performance), users (actors), location (stage), tangible objects and devices present (props) and/or past user/system interaction (script).

The action part is executed after the beat has been selected by the engine for sequencing. It is subdivided in an initialization part (component information) and a main part (component content). In the initialization part, the author can specify which story values need to be modified in the story memory before the presentation is started. The main part specifies the interactive mixed reality presentation, encoded as an SMIL document in our case. An extra level of adaptation is introduced by allowing the multimedia presentation document to contain embedded queries with story values as parameters. These parameters are set at run-time by the Ambient Narrative engine. This approach allows for more variation in the media-enhanced performances and also reduces the amount of the authoring effort needed. The SMIL document also contains links and/or queries with story values as parameters to the beat-sequencing engine.

The post-conditions part (component information) is executed when the currently active beat is about to be replaced by a new beat, i.e., before the pre-conditions part of the next beat is executed. The author can specify here which story values need to be modified in the story memory.

The plots at the scene level comprise five stages: initial state, required events, background knowledge, content constraints and temporal constraints. The initial state sets up the scene and may be similar to the initialization part in our action stage. The required events and background knowledge are comparable to the pre-conditions stage, while the content constraints that limit the binding of the variables used in the required events are similar to the embedded queries in the main action description part of the Ambient Narrative beat documents.

Beat Sequencing

Beats are sequenced together to create a personalized story in mixed reality, the result of which is what we have called Ambient Intelligence. The beat descriptions and beat sequencing engine or Ambient Narrative engine are an adaptive hypertext system. By adaptive hypermedia systems we mean all hypertext and hypermedia systems that reflect some features of the user in the user model and apply this model to adapt various visible aspects of the system to the user. In other words the system satisfies three criteria: it is a hypertext or hypermedia system; it is a user model; and it is able to adapt the hypermedia model using this model." An Adaptive Hypermedia Application Model (AHAM) defines a hypermedia application as consisting of a domain model, user model, teaching model and adaptive engine. The domain model describes how the information is structured in nodes and links. The user model describes the knowledge level of the user and also keeps a record of the nodes visited by the user in the past. The teaching model consists of learning rules that define how the domain model interacts with the user model. The adaptive engine performs the actual adaptation.

The beat descriptions and beat-sequencing engine are now described in terminology of the AHAM model. The beats and their interrelationships form the domain model. The user model is implicit in the story memory of the Ambient Narrative engine. The story memory contains session knowledge and context knowledge, which includes knowledge about the user and user's context. The story memory dynamically evolves out of the continuous interaction between users and the Ambient Narrative. The teaching model is encoded in the beat descriptions. The action initialization part and post-conditions part allow the author to alter story values that can affect the selection of new beats and content items. The adaptive engine is the Ambient Narrative engine that sequences beats. The Ambient Narrative engine implements an action selection mechanism as its main task to find the next best beat. Instead of a rule-based AI approach, a preferred embodiment implements the beat sequencing planner by an information retrieval (IR) approach. Queries for new beats are encoded in the action and post-condition parts of the beat description that may contain both fixed parameters and story values. Beat queries are never explicitly entered by the user; they are selected and filled in by the beat-sequencing engine based on user input and information present in the story memory.

An advantage of this approach is that it allows introduction of adaptation at different levels of the Ambient Narrative. The notion of embedded content queries in beats allows description of adaptation at the subnode level, i.e., the media objects in the SMIL document that encodes the action part of the beat. The notion of embedded beat queries in beats allows description of adaptation at the link level. The choice of a beat can be made context-dependent by using story values in the embedded beat queries. The use of beat pre-conditions and embedded content queries allow addition of new beats and content concurrent with Ambient Intelligence environment execution. This allows deferral of editing decisions by the Ambient Narrative engine on both the node and subnode level until the moment they are played out. As a result, authoring effort is reduced, because the author does not have to explicitly sequence story elements into a finished story or rewrite the existing Ambient Narrative when new material is added. This also provides the writer with the flexibility to add beats for specific devices that can be chosen if these devices are owned by the reader. Furthermore, this open approach creates possibilities for sharing and exchanging beats and content among Ambient Narratives. Authoring tools assist readers in creating their own beats and inserting them in their beat collection.

FIG. 8 provides a flow diagram of an Ambient Narrative engine, which performs the steps described in detail below. User input (implicitly derived from sensors or explicitly given by the user) and a story memory together determine the direction through the Ambient Narrative and how the selected beats are customized and sequenced.

Step 1 (listen for events 801): detecting events from sensors and input devices by an Ambient browser and forwarding relevant events to an AN engine. In the mirror TV case 400 (FIG. 4) a sensor in the floor might send an event 802 to the Ambient browser that interprets the event and forwards it to the AN engine.

Step 2 (handle event 803): the AN engine checks if one of the triggers currently active is triggered by the event 802. If this is true, the AN engine uses the story memory and the user information to fill in the parameters of the trigger. This way, variation in navigation is introduced. If the trigger turns out to be a link to a parameterizable beat the AN engine jumps to step 4 809; if the trigger is a link to a finalized beat, the AN engine jumps to step 5. A beat is finalized if all of its open parameters have been filled in. If the trigger turns out to be a query for a beat, the AN engine continues with step 3. If there is no such trigger, the database containing the beats is queried using only the story memory and user information present (step 3). Before the new beat is selected, the post-conditions part of the old beat is executed, and any changes in story values are also communicated to the story memory. In our example, the floor-sensor event is interpreted and triggers a query for a new beat,? which contains the query attributes location ("bathroom") and the user ID of the person standing on the floor sensor (the child).

Step 3 (retrieve beat 807): retrieving and ranking beats. According to some similarity measure the query for a beat is compared with the top results. The best matching beat is selected and finalized in step 4. Story values used in the beat query are read from story memory and inserted as query terms. If the ranking is below a certain threshold, it is possible to return no beat, meaning that the currently running application, and presentation in the Ambient Browser is still the most relevant one. In the mirror TV 400 example, the best matching beat is an interactive multimedia presentation describing a cartoon that makes the toothbrush activity more entertaining, as show in FIG. 4.

Step 4 (finalize beat 809): finalizing the selected beat, i.e., filling in the open parameters. The embedded queries in the action part of the newly selected beat are executed. Story values used in the embedded content queries are read from story memory and inserted as query terms. The results of these queries (a list of URLs pointing to content items) are checked for consistency/availability. If they are available, they are inserted in the beat description that is being finalized. If the beat cannot be finalized, a new one is chosen by returning to step 3. The triggers and story values that the AN engine should react to when the Ambient browser fires them are also identified at this stage (for step 5). The AN engine now reads the action part of the toothbrushing beat and retrieves the URL of today's cartoon from a server and inserts it into the SMIL template that is now the final form of a SMIL document.

Step 5 (update session 811): updating the story memory and user profiles active in this Ambient Narrative session. Management of the session also takes place in this step.

Step 6 (set finalized beat 812): setting the triggers to which the AN engine will listen and sending the finalized beat to the Ambient browser to update the presentation and the triggers it should listen to. The engine is now again waiting in this session for events from the Ambient browser, i.e., the engine returns to step 1 801. In the media-enhanced toothbrushing example 400, the final SMIL document describing the interactive cartoon presentation is now forwarded to the Ambient Browser and the initialization part of the beat description is executed, setting the "toothbrush" story value in the story memory. The AN engine then sets the triggers that can respond to the beat queries and beat links specified in the SMIL document.

The design of the Ambient Narrative engine is a drama manager that uses user input and a story memory to sequence beats into an immersive interactive story. The link structure is adapted based on user interaction and the nodes are also adaptable to some extent, because embedded queries are allowed in the beat description language.

Within-Component Layer: Plot Material

Depending on whether one looks at the Narrative level or at the hypermedia level, the SMIL document is either an atomic component or a composite component. In the first case the component content in the within-component layer are SMIL documents; in the second case the component content are media objects, text, images, audio, video and other modalities such as lightscripts. All the component information and content are indexed and stored in an Ambient Narrative database for fast retrieval by the Ambient Narrative engine.

The foregoing is a way to break up Ambient Intelligence environments in smaller modular parts that can be assembled by end-users (members of the public). By interacting with so-called Ambient Narratives, end-users create their own personal story, their own Ambient Intelligence from a large number of possibilities defined by an experienced designer in advance. Although this method allows individual end-users to create their own Ambient Intelligence, the customization is still limited because end-users follow predefined paths. So far, the end-users are only seen as readers and not as writers. To allow end-users to program their own Ambient Intelligent environment, a preferred embodiment enables end-users to create their own beats and add these beats to the Ambient Narrative in an intuitive way.

If one views reading an Ambient Narrative as a performing act, then writing an Ambient Narrative can be seen as the rehearsal of a performance. Actors and backstage personnel rehearse a theatre play by rearranging the props on the stage floor, setting the light and reading the script aloud. When the actors later perform their act on stage, they repeat this behavior and reuse the composition of props and actors on the stage. If actors and backstage personnel are replaced in this scenario by end-users and the theatre play by the environment where the end-user is involved in activities, an interaction metaphor results for end-user programming of Ambient Intelligence environments.

To allow end-users to write or modify existing beats the following are provided by a preferred embodiment:

1. Visualization of the Ambient Narrative to the end-user 101;

2. An interface that allows the end-user to specify pre-conditions and applications since a beat consists of a set of pre-conditions and an application; and 3. Functionality to update the Ambient Narrative.

Each of these is discussed in the following sections;

1. Visualization of the Ambient Narrative

Figure 1:
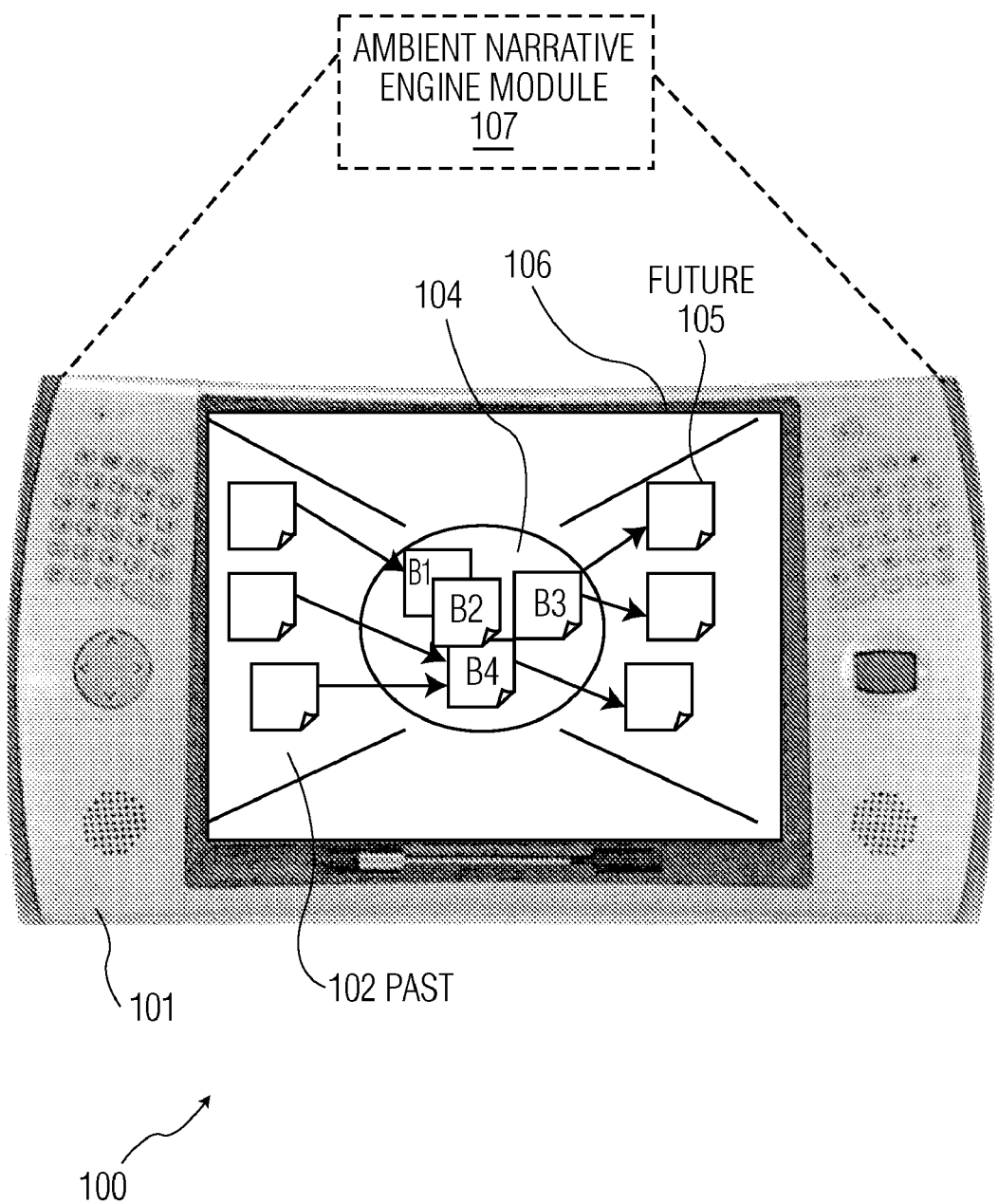
FIG. 1 illustrates a mobile device having a display that shows which beats are active in the room where a wireless screen is present.

In a preferred embodiment, to visualize the Ambient Narrative to the end-user a wireless device having a display 101 can be used (e.g., PDA, web tablet or mobile phone) that shows which beats are active in the room where the wireless display is located. Since the end-user is carrying this wireless display, the end-user can easily see the beats that are active. Next to the beats that are active in the current room, the end-user can also see the incoming and outgoing links between beats to get a better view of the state of the Ambient Narrative and possible transitions. FIG. 1 illustrates a visualization of an Ambient Narrative in which B1 to B4 represent beats that are currently active in the same location as the mobile device 101.

2. Specifying Beat Pre-Conditions and Action

When the user opens an active beat, a new window appears where the user can see the pre-conditions and application that belong to the beat. FIG. 12 shows a screenshot of the authoring application under construction. (A new beat is basically modifying an empty beat.) The preview area 1,201 shows what the effect of the beat is (a preview in this case is an image). The pre-conditions part 1,202 allows the user to add or remove context pre-conditions. The action part 1,203 allows the user to select from a list of possible applications or scripts. If the user selects an action, the code (SMIL markup) is shown in the text area below.

The user can also choose to remove a beat or add a beat (e.g., by clicking on empty space in the display). The customization or creation of a beat requires that the pre-conditions and action-description parts are filled in:

A. Pre-Condition Part:

1. Setting conditions for props: The end-user touches or otherwise selects the devices in the room that the user wants to use for a particular Ambience. If the user wants to listen to an audio book, the user selects the stereo in the room and a touch pad, for example.

[0]The touch pad could be used to navigate within the audio book (pause, fast forward, etc.) or maybe choose another one if one is bored. This is what happens during normal interaction.

[0]The touch pad could be used to navigate within the audio book (pause, fast forward, etc.) or maybe choose another one if one is bored. This is what happens during normal interaction.

If it is desired to program this behavior, a new beat must be created and devices to be used must be selected (and an application chosen that runs with this set). This can be done by touching them or by visually marking devices with some kind of bar code and reading this bar code with a PDA. The first method requires that each device has a built-in sensor, when it is touched and the "new beat" or "edit beat" mode is active; this results in a new device popping up in the pre-conditions list of the authoring tool (see FIG. 12, element 1202). The second method can be to hold the PDA close to the visual marker (e.g., bar code) of the device during the new or edit beat mode. This latter approach allows old equipment to be used as well.

2. Setting conditions on actors: The end-user can indicate the user's role as an actor by wearing a piece of clothing that resembles that role. For example, by wearing a bathrobe the user indicates that the user is programming a bathroom activity. (In a service environment, costumes are often already indicating roles.). The sensing could be done by an RFID tag reader built in a PDA that the user is carrying to program his environment. An alternative is to scan a visual marker on the costume with the PDA (same as previously discussed for the devices). Tags or visual markers must be unique for this to work and there should be a reference to a description. It is easy to imagine that a tag or visual marker encodes a URL to an XML document on the Web that contains information about the object that can be used by the PDA.

3. Setting conditions on stage: The end-user can indicate a location by walking across the room. In the audio book example, the user may move to the armchair near the fireplace. In the user interface the end-user sees that the space where the user has walked is highlighted (e.g., walking has a paintbrush effect in the display). [0]This can be seen in FIG. 2. The user (207) has created an area (208) by walking around.

Figure 2:
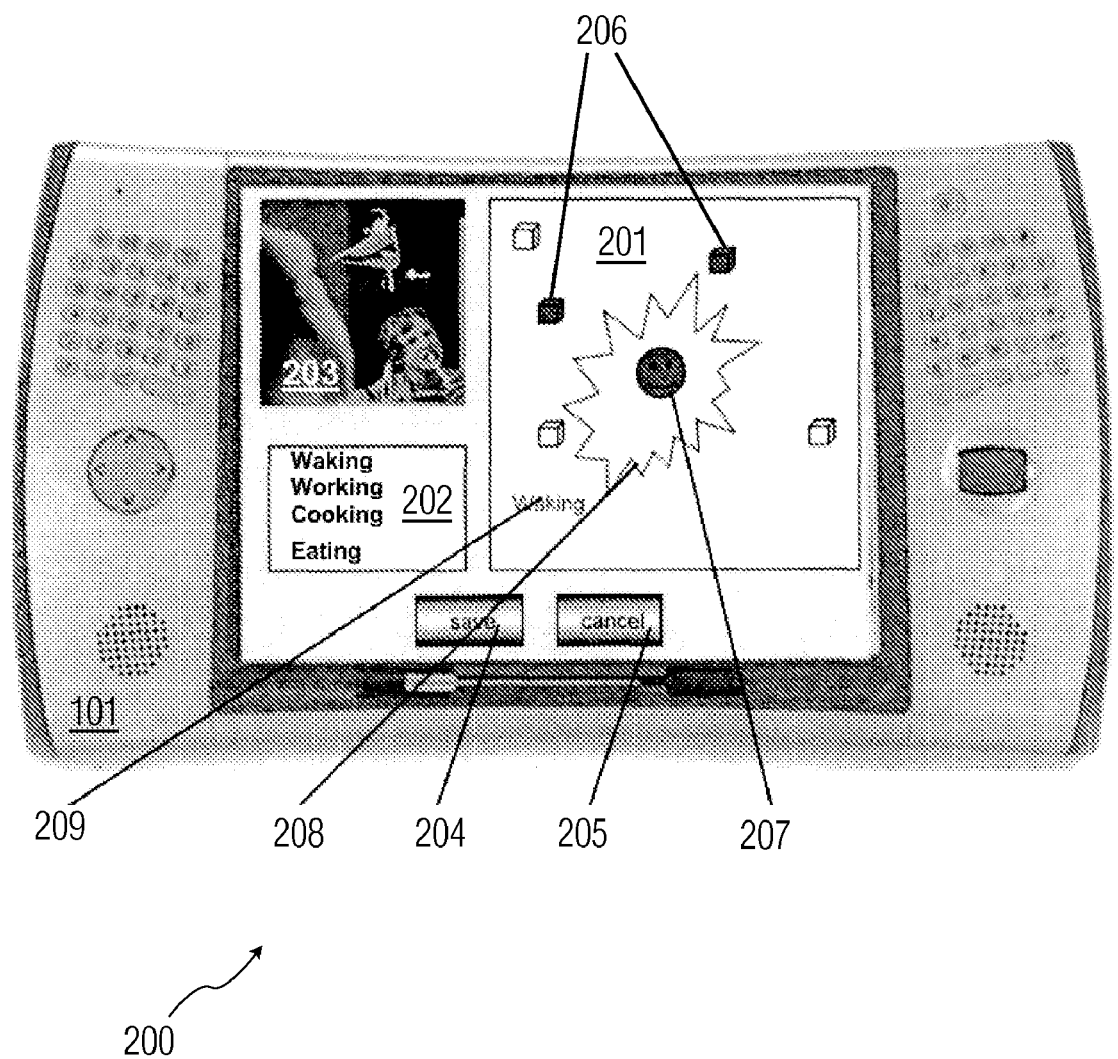
FIG. 2 illustrates a completed beat composed of a display of a mobile device.

FIG. 2 is a more detailed way of programming the pre-conditions than the simple tree shown in the screen shot.

4. Setting conditions on performance: Using costumes and choosing devices may have already limited the performance. The end-user can set further restrictions such as the time and date (which also relate to stage) in a conventional way (e.g., through the user interface of the wireless device the user is carrying). In the audio book example, time could be set to evenings.

5. Setting conditions on script: The end-user may also associate one or more states with the existing pre-conditions. For example, the "calm/relaxing" state can be added by the end-user to indicate that the beat can only be started if the "calm relaxing" state is true. Events like sitting down or walking are restrictions on the performance. At this time it is not possible to easily deduce many of these high-level events with sensors in a reliable manner so setting conditions on performance is limited in a preferred embodiment to time and date. For the conditions on the script this is even truer. It is difficult to sense if somebody is in a calm relaxing state. The concept of states or story values introduces a sense of history and future in the model of the Ambient Narrative. One approach is for a beat to set a story value and then this affects the selection process of future beats. In a preferred embodiment, these states are chosen by the user from a list of states.

B. Action Part:

1. Choosing the application: The end-user can select, via the interface of the mobile device 101, one or more applications from a pool of applications (filtered by the possibilities of the selected devices) and associate the application(s) with the pre-conditions.

Once all steps above have been performed, the beat can be saved. FIG. 2 illustrates a completed beat. The right-hand side 201 of the display represents the stage. Selected devices (boxes) 206, users 207 and the space where the user 208 has walked are highlighted. A story value "Waking" 209 on the stage indicates a script pre-condition. The left-hand side shows an icon 203 representing the application that is associated with the context pre-conditions on the right. The list of story values 202 under this icon is used to add or remove story values from the pre-conditions. The save 204 and cancel 205 buttons are used to update the beat or revert back to an earlier version (if one exists).

The end-user always sees the effect of the user's rehearsal actions on stage represented on the display of the mobile device. This way the end-user gets immediate feedback. Contrary to most existing end-user programming techniques and methods, in a preferred embodiment, the programming takes place in the real world by rehearsal and not in a virtual world, e.g., on a screen. Only feedback on the rehearsal process is given through the virtual channel. [0]That is, the user sees what the user is doing on the user's PDA (FIG. 2). This means that the user sees new devices appearing in FIG. 2 when the user touches or scans them (206) and that when the user walks around to set the stage the user sees area 208 growing in size.

3. Update Ambient Narrative

The Ambient Narrative is automatically updated after the beat is saved. The default behavior for beats is that they will be activated ONLY if all their pre-conditions become true; a little more information about the structure of the ambient narrative is needed here. Every ambient narrative has an initialization beat document that triggers one or more stage beats (one stage beat for each separate stage). This part of the ambient narrative is fixed and cannot be altered by end-users. On top of the stage beats, end-users can create their own beats. By default the user-created beats are associated with the stage they belong to. To do this, the authoring engine modifies the stage beat so that the user-created beat is triggered when all its pre-conditions hold. This creates the default behavior (beats are only activated if all their pre-conditions become true).

The end-user can override this behavior by associating the beat with another already existing beat. [0]End-users can only create links between user beats to ensure that the overall structure remains intact. If the selected beat is the target of a link, its trigger will be removed from the stage beat and become a link in the anchor beat. This means that the selected beat now can only be activated when it is activated from this other beat. If this happens the ambient narrative engine will check if all the pre-conditions of the target are true; if that is the case it will start the target of the link. This works as follows:

The end-user selects a beat on the overview screen. An example of an overview screen is shown in FIG. 1. The present set of beats is the set of beats currently active on the stage where the PDA is located. Arrows between the past and the present are incoming links; arrows between the present and the future are outgoing links. The idea is that the user can associate the newly created or modified beat to either a beat in the incoming part or in the outgoing part (but never both). In the first case the newly created or modified beat is the target of the new link; in the second case the newly created or modified beat is the anchor of the new link.

Figure 3:
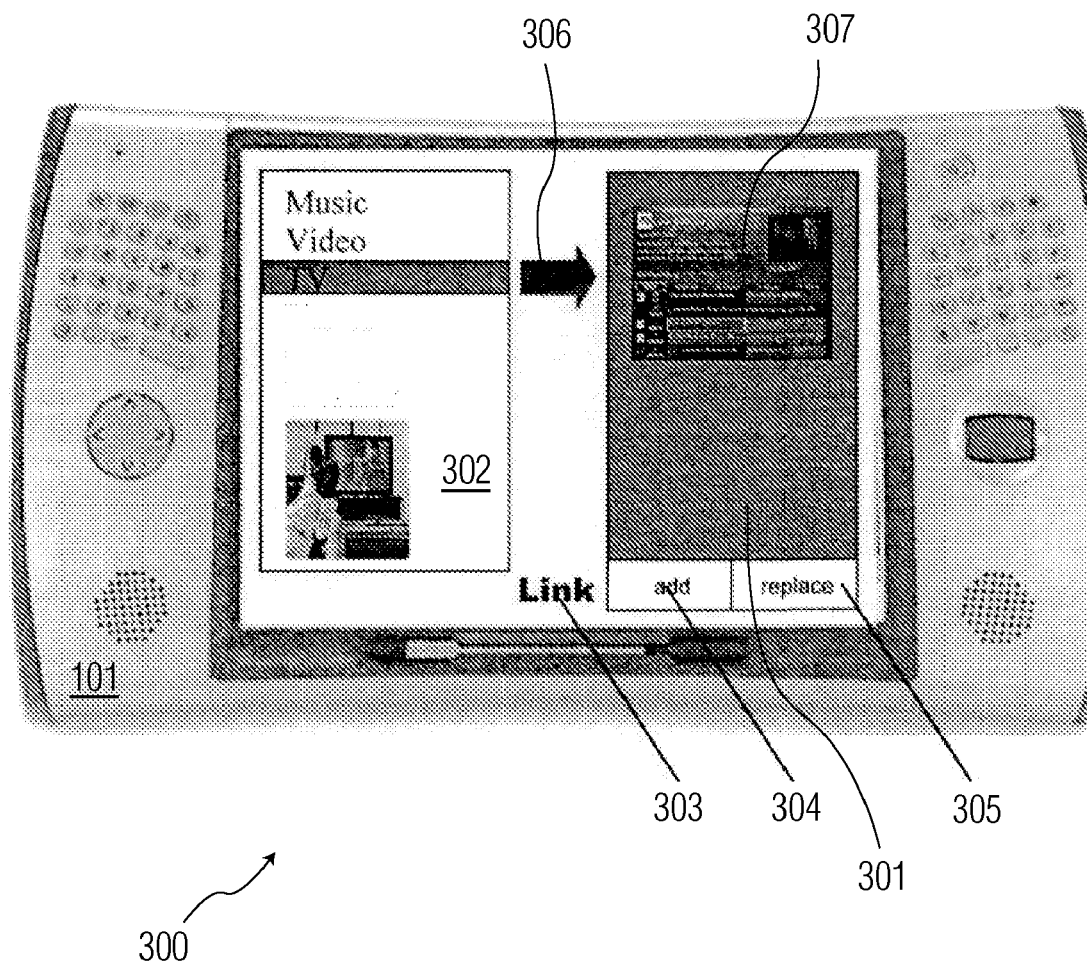
FIG. 3 illustrates linking beats.

The end-user selects another beat (while holding a button pressed on the PDA to indicate that the user wants to select more than one beat and therefore wants to create a link between the two selected beats) or clicks on an empty space in the incoming 102 or outgoing 105 part on the overview screen that brings up a list of beats to choose from. A window appears on the display of the mobile device that shows both selected beats. The end-user can change this if needed. This is shown in FIG. 3. If the newly created or modified beat is represented by the left-hand side (302), we are creating a link where the newly created/modified beat forms the anchor of the link. If the newly created/modified beat is shown on the right-hand side (301) it will become the target of the link.

The end-user can now customize the anchor of the link further to specify more exactly when the link should be traversed. In case of FIG. 3 the user is selecting that he wants the link to be traversed when the "TV" state is reached in the application that is tied to the anchor beat. The application states cannot be created by the end-user; an application programmer has created them. There must be support for the beat-authoring approach in the applications used. First, there must be a way to add "hooks" in the application so that end-users can add link instructions in the application. The three options in FIG. 3 (music, video and TV) are states that are exposed to the outside world and to which they can be connected. Second, the application must be able to communicate to the ambient narrative engine; otherwise the command to traverse the link never reaches the engine. Third, the application must also respond to a stop command of the ambient narrative engine if the engine determines that the beat it is tied to is no longer valid. The user can also specify if the anchor beat should be removed (replace) or not (add) after the link has been followed.

If the end-user has made his choice, a new link will appear in the beat overview screen.

This way, end-users can specify if a beat should be activated automatically or if a beat must be started from another application.

FIG. 9 illustrates an apparatus for programming-by-rehearsal an Ambient Intelligence environment comprising a virtual environment 101 to provide feedback of programming-by-rehearsal actions 905 and selections 903 of the end-user in displays 904 and an AN engine 901 and story memory 902 including beats and links therebetween.

FIG. 10 illustrates a system including the apparatus of FIG. 9 and a network of "intelligent" 1,001 devices and costumes from which programming-by-rehearsal events 905 originate.

FIG. 11 describes a detailed system of architecture. End-users see which beats are active through the graphical user interface (GUI) on their PDA and can create/modify beats and links (overview screen, create/edit link, create/edit beat, and edit pre-conditions 904). End-users can also implicitly set the pre-conditions (edit pre-conditions). Once the end-user is satisfied the end-user can save the new or modified beat or link. An authoring interface 1,002 to the AN engine 901 updates the ambient narrative contents and informs the ambient narrative engine that it must recalculate its state. The AN engine 901 checks its state and queries the ambient narrative content database 902 to find out if existing active beats must be modified. The AN engine also checks for added or removed triggers in the stage beats to see if any new beats must be started or old ones must be stopped. The AN engine 902 updates its state 1,003 to match these changes and notifies both the end-user programming tool and the rendering platform of the changes in the active beat set. The end-user programming GUI updates the overview screen. The rendering and interaction platform updates the running presentation according to the new set of documents and instructs the individual devices to render their part of the Ambient Intelligence experience. The end-user immediately sees feedback of the end-user's actions through the environment (a different Ambient Intelligence experience) and his authoring interface (different set of active beats).

The system, apparatus and method of the present invention apply to media-enhanced environments designed to support everyday life performances (Ambient Intelligence environments) and context-aware systems in general. End-user programming will grow in importance as more and more devices become network-enabled and part of our surroundings. Old metaphors such as the remote control and the computer desktop then break down.

While the preferred embodiments of the present invention have been illustrated and described, it will be understood by those skilled in the art that the system, apparatus and method for programming-by-rehearsal of an Ambient Intelligence environment as described herein are illustrative and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention include all embodiments falling within the scope of the appended claims.

The invention claimed is:

1. A system (100) for an end-user to program an Ambient Intelligence environment, the Ambient Intelligence environment being a digital environment that is sensitive, adaptive, and responsive to the presence of people, the system comprising:

an Ambient Narrative engine (107) for processing an ambient narrative, the ambient narrative being a set of pre-defined, interrelated and modular programmable parts in the digital environment called beats, a beat having a pre-condition part comprising at least one pre-condition and an action part comprising at least one application associated with the at least one pre-condition, wherein a default behavior of the beat is that the at least one application is executed when all the pre-conditions of the beat become true;

wherein the Ambient Narrative engine is arranged for visualizing to the end-user the ambient narrative, and the system further comprises an interface for programming the Ambient Intelligence environment via pro gram-by-rehearsal, the interface comprising screen area called a virtual stage (106) for the end-user to be presented with programming options of the beats for said programming and provided feedback of an effect of programming options invoked in a real world location corresponding to the virtual stage by the end-user performing said rehearsal with respect to said at least one beat and for programming at least one beat for inclusion in the ambient narrative using the invoked beat programming options.

2. The system of claim 1, further comprising:
a portable wireless device (101) having a location (103) and comprising the interface (106) that includes a screen (106) comprising the virtual stage on which is displayed:
each beat (104) that is active in the location (103), and
incoming (102) and outgoing (105) links between each active beat (104).

3. The system of claim 2, wherein:
the interface is arranged for programming said at least one pre-condition by the end-user specifying a pre-condition on an item selected from a prop, an actor, a staging, a performance, and a script;
the interface is further arranged for programming said at least one application by selecting from a pool of pre-determined applications, being filtered by the possibilities of the at least one pre-condition; and
said portable wireless device is further configured to enable the end-user to program-by-rehearsal in the real world while receiving feedback on the virtual stage a function selected from the group consisting of specifying a displayed beat (104) for modification thereof, deleting a displayed beat (104), and adding a new beat.

4. The system of claim 3, wherein
specifying the pre-condition on the prop includes a touch by the end-user of at least one device at the location (103) to be included in the beat being rehearsed;
specifying the pre-condition on the actor includes a specification by the end-user of a costume that indicates a role being played by the actor in a beat being rehearsed;
specifying the pre-condition on the staging includes a walk by the end-user from a first position to a second position in the location (103);
specifying the pre-condition on the performance includes a specification by the end-user of an item selected from the group consisting of a time of day and date; and
specifying the pre-condition on the script includes delineation by the end-user of a mood.

5. The system (100) of claim 3, wherein when the end-user selects a function from the group consisting of modification of a displayed beat (104) and addition of a new beat, the screen further displays a window including at least one pre-condition and application of the beat (104) and which can be associated with one another added to the beat by the end-user.

6. The system (100) of claim 1, wherein a plurality of beats exists and the end-user can override the default behavior of a first beat by linking of the first beat as a target beat with another already existing beat of the plurality as an anchor beat (301.1).

7. The system (100) of claim 6, wherein an application of the anchor beat includes a list of events from which a new application can be started and the target beat is linked to one event of the list.

8. The system (100) of claim 7, wherein the anchor beat is removed from the ambient narrative after the link from the anchor beat to the target beat has been traversed.

9. An apparatus (106 107) for an end-user to program an Ambient Intelligence environment, the Ambient Intelligence environment being a digital environment that is sensitive, adaptive, and responsive to the presence of people, the apparatus comprising:

an Ambient Narrative engine module (107) that an ambient narrative, the ambient narrative being a set of pre-defined, interrelated and modular programmable parts in the digital environment called beats, a beat having a pre-condition part comprising at least one pre-condition and an action part comprising at least one application associated with the at least one pre-condition, wherein a default behavior of the beat is that the at least one application is executed by the engine when all the pre-conditions of the beat become true;

wherein the Ambient Narrative engine module is arranged for visualizing to the end-user the ambient narrative, and the apparatus further comprises a visual interface for programming the Ambient Intelligence environment via program-by-rehearsal, the visual interface comprising screen area called a virtual stage (106) for the end-user to be presented with programming options invoked in a real world location corresponding to the virtual stage by the end-user performing said rehearsal with respect to said at least one beat and for programming at least one beat for inclusion in the ambient narrative using the invoked beat programming options.

10. The apparatus (106 107) of claim 9, wherein the visual interface (106) further comprises a screen (106) that displays on the virtual stage:
each beat (104) that is active in the location (103); and
incoming (102) and outgoing (105) links between each active beat (104).

11. The apparatus (106 107) of claim 10, wherein:
the interface is arranged for programming said at least one pre-condition by the end-user specifying a pre-condition on an item selected from a prop, an actor, a staging, a performance, and a script;
the interface is further arranged for programming said at least one application by selecting from a pool of pre-determined applications, being filtered by the possibilities of the at least one pre-condition; and
said visual interface (106) is further configured to enable the end-user to program-by-rehearsal in the real world while receiving visual feedback, a function selected from the group consisting of specifying a displayed beat (104) for modification thereof, deleting a displayed beat (104), and adding a new beat.

12. The apparatus (106 107) of claim 11, wherein:
specifying the pre-condition on the prop includes a touch by the end-user of at least one device at a location (103) to be included in the beat being rehearsed;
specifying the pre-condition on the actor includes a specification by the end-user of a costume that indicates a role being played by the actor in the beat being rehearsed;

specifying the pre-condition on the staging includes a walk by the end-user from a first position to a second position at a location (103);

specifying the pre-condition on the performance includes a specification by the end-user of an item selected from the group consisting of a time of day and date; and specifying the pre-condition on the script includes delineation by the end-user of a mood.

13. The apparatus (106 107) of claim 11, wherein:
when the end-user selects a function from the group consisting of modification of a displayed beat (104) and addition of a new beat, the visual interface (106) further displays a window including at least one pre-condition and application of the beat (104); and the visual interface is further configured to allow the end-user to associate the at least one application with the at least one pre-condition added to the beat by the end-user.

14. The apparatus (106 107) of claim 9, wherein a plurality of beats exists and the visual interface is further configured to allow the end-user to override the default behavior of a first beat by linking the first beat as a target beat with another already existing beat of the plurality as an anchor beat (301.1).

15. The apparatus (106 107) of claim 14, wherein an application of the anchor beat includes a list of events from which a new application can be started and the end-user can link a target beat to one event of the list.

16. The apparatus (106 107) of claim 7, wherein the anchor beat is automatically removed from the ambient narrative after the link from the anchor beat to the target beat has been traversed.

17. A method for an end-user to program an Ambient Intelligence environment, the Ambient Intelligence environment being a digital environment that is sensitive, adaptive, and responsive to the presence of people, the method comprising the steps of:
providing an ambient narrative, the ambient narrative being a set of pre-defined, interrelated and modular programmable parts in the digital environment called beats, a beat having a pre-condition part comprising at least one pre-condition and an action part comprising at least one application associated with the at least one pre-condition, wherein a default behavior of the beat is that the at least one application is executed when all the pre-conditions of the beat become true;

providing a visual interface for programming the Ambient Intelligence environment via program-by-rehearsal, the interface comprising screen area called a virtual stage (106);

visualizing to the end-user the beats of the ambient narrative on the virtual stage;

presenting to the end-user programming options of the beats for said programming via the visual interface;

feeding back to the virtual stage effects of programming options invoked in a real world location corresponding to the virtual stage by the end-user performing said rehearsal; and programming at least one beat for inclusion in the ambient narrative using the invoked beat programming options.

18. The method of claim 17, wherein the step of providing a visual interface further comprises the step of providing a screen comprising the virtual stage (106) on which is displayed:
each beat (104) that is active in a location (103); and
incoming (102) and outgoing (105) links between each active beat (104).

19. The method of claim 18, wherein:
the step of programming the ambient narrative further comprises the step of the end-user specifying:
said at least one pre-condition on an item selected from a prop, an actor, a staging, a performance, and a script; and
said at least one application from a pool of pre-determined applications, being filtered by the possibilities of the at least one pre-condition; and the presenting step further comprises the step of the end-user programming-by-rehearsal in the real world while receiving feedback on the virtual stage a function selected from the group consisting of specifying a displayed beat (104) for modification thereof, deleting a displayed beat (104), and adding a new beat.

20. The method of claim 19, wherein
specifying the pre-condition on the prop includes a touch by the end-user of at least one device at the location (103) to be included in the beat being rehearsed;

specifying the pre-condition on the actor includes a specification by the end-user of a costume that indicates a role being played by the actor in a beat being rehearsed;

specifying the pre-condition on the staging includes a walk by the end-user from a first position to a second position in the location (103);

specifying the pre-condition on the performance includes a specification by the end-user of an item selected from the group consisting of a time of day and date; and specifying the pre-condition on the script includes delineation by the end-user of a mood.

21. The method of claim 19, wherein when the end-user selects a function from the group consisting of modification of a displayed beat (104) and addition of a new beat, further comprising the steps of:
the screen displaying a window that includes at least one pre-condition and application of the beat (104) which can be associated with one another; and adding an association from the screen display to the beat by the end-user.

22. The method of claim 17, wherein:
a plurality of beats are provided by the step of providing an ambient narrative; and
overriding by the end-user the default behavior of a first beat by linking of the first beat as a target beat with another already existing beat of the plurality as an anchor beat (301.1).

23. The method of claim 22, further comprising the steps of:
including in an application of the anchor beat a list of events from which a new application can be started; and
linking the target beat to one event of the list.

24. The method of claim 23, further comprising the step of removing the anchor beat from the ambient narrative after the link from the anchor beat to the target beat has been traversed.

* * * * *